(12) United States Patent
Yang et al.

(10) Patent No.: US 12,275,296 B2
(45) Date of Patent: Apr. 15, 2025

(54) POWER ASSEMBLY AND ELECTRIC VEHICLE

(71) Applicant: Huawei Digital Power Technologies Co., Ltd., Shenzhen (CN)

(72) Inventors: Shaobo Yang, Dongguan (CN); Haisong Xu, Shanghai (CN); Jiangang Wang, Dongguan (CN); Jun Chen, Dongguan (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 233 days.

(21) Appl. No.: 17/994,630

(22) Filed: Nov. 28, 2022

(65) Prior Publication Data

US 2023/0087205 A1    Mar. 23, 2023

Related U.S. Application Data

(63) Continuation of application No. PCT/CN2020/092730, filed on May 27, 2020.

(51) Int. Cl.
  *B60K 1/00* (2006.01)
  *H02K 5/20* (2006.01)

(52) U.S. Cl.
  CPC ............... *B60K 1/00* (2013.01); *H02K 5/203* (2021.01); *B60K 2001/006* (2013.01)

(58) Field of Classification Search
  CPC ............... B60K 1/00; B60K 2001/006; B60K 2001/001; B60K 11/02; H02K 5/203; H02K 1/32; H02K 7/116; H02K 9/19; B60Y 2306/03; Y02T 10/64
  See application file for complete search history.

(56) References Cited

U.S. PATENT DOCUMENTS

| 3,675,056 | A | * | 7/1972 | Lenz | H02K 9/20 |
| | | | | | 310/59 |
| 2004/0134693 | A1 | * | 7/2004 | Yamagishi | H02K 7/116 |
| | | | | | 180/65.1 |
| 2004/0163409 | A1 | | 8/2004 | Nakajima et al. | |
| 2012/0049669 | A1 | * | 3/2012 | Garriga | H02K 9/12 |
| | | | | | 310/59 |

(Continued)

FOREIGN PATENT DOCUMENTS

| CN | 109038951 A | 12/2018 |
| CN | 109997296 A | 7/2019 |

(Continued)

*Primary Examiner* — Thomas Truong
(74) *Attorney, Agent, or Firm* — Conley Rose, P.C.

(57) ABSTRACT

A power assembly includes a rotor iron core, a gear set, a rotating shaft, and an oil-pumping system. The rotating shaft is fixedly connected to the rotor iron core and a driving gear in the gear set. The housing has an oil storage pool at a bottom and an oil collection tank at a high location, a part of a structure of a first gear in the gear set is located in the oil storage pool, and the first gear rotates to drive cooling oil in the oil storage pool to be raised and collected by the oil collection tank. The rotating shaft has a cooling oil channel inside. The cooling oil in the oil collection tank flows to the cooling oil channel, to dissipate heat from the rotor iron core.

20 Claims, 10 Drawing Sheets (56) References Cited

U.S. PATENT DOCUMENTS

| | | | |
|---|---|---|---|
| 2012/0091836 A1* | 4/2012 | Hayashi | F16H 57/0412 |
| | | | 165/185 |
| 2012/0286607 A1 | 11/2012 | Shimizu et al. | |
| 2016/0226327 A1* | 8/2016 | Rippel | H02K 9/197 |
| 2016/0233738 A1* | 8/2016 | Makino | H02K 7/006 |
| 2019/0170140 A1 | 6/2019 | Yamaguchi | |
| 2019/0173359 A1* | 6/2019 | Ishikawa | H02K 1/32 |
| 2019/0305643 A1 | 10/2019 | Huber et al. | |
| 2020/0109658 A1* | 4/2020 | Yang | H02K 9/19 |
| 2022/0006354 A1 | 1/2022 | Wang et al. | |
| 2022/0037955 A1 | 2/2022 | Wang et al. | |

FOREIGN PATENT DOCUMENTS

| | | |
|---|---|---|
| CN | 110259923 A | 9/2019 |
| CN | 110365138 A | 10/2019 |
| CN | 110492663 A | 11/2019 |
| CN | 110707843 A | 1/2020 |
| CN | 109563828 B | 11/2020 |
| DE | 102018111418 A1 | 11/2019 |
| EP | 1414134 A2 | 4/2004 |
| JP | 2011148378 A | 8/2011 |
| JP | 2012109356 A | 6/2012 |
| JP | 2013013182 A | 1/2013 |
| JP | 2013240125 A | 11/2013 |
| JP | 5939351 B2 | 6/2016 |
| WO | WO-2014125856 A1 * | 8/2014 ........... B60K 17/043 |

* cited by examiner

POWER ASSEMBLY AND ELECTRIC VEHICLE

CROSS-REFERENCE TO RELATED APPLICATIONS

This is a continuation of International Patent Application No. PCT/CN2020/092730 filed on May 27, 2020, the disclosure of which is hereby incorporated by reference in its entirety.

TECHNICAL FIELD

This application relates to the field of mechanical device technologies, and in particular, to a power assembly and an electric vehicle.

BACKGROUND

Currently, a usage rate of an electric vehicle is increasingly higher, and an important embodiment of performance of the electric vehicle is a power assembly of the electric vehicle. With development of the electric vehicle, a demand for miniaturization of the power assembly of the electric vehicle is increasing higher, and power density increases accordingly. However, as the power density increases, increasingly more heat is generated when the power assembly works. Therefore, how to improve heat dissipation efficiency of the power assembly is an urgent technical problem to be resolved.

In the current technology, a water-cooled heat dissipation technology is usually used to dissipate heat from a motor. However, a power density of water-cooled heat dissipation is low, and cooling water cannot be directly in contact with components of the motor because the cooling water has no insulation, resulting in a high thermal resistance of a water-cooled link. In addition, the water-cooled heat dissipation technology requires high structural precision of the components of the motor. To overcome the foregoing problems, an oil-cooled heat dissipation technology may be used to dissipate heat from the motor. However, there is still a specific problem in a current specific solution using the oil-cooled heat dissipation technology, and heat dissipation efficiency of the power assembly is difficult to meet a requirement.

SUMMARY

This application provides a power assembly and an electric vehicle, to improve a heat dissipation effect of a rotor of the power assembly, thereby improving working stability of the power assembly, prolonging a service life of the power assembly, and prolonging a service life of the electric vehicle.

According to a first aspect, this application provides a power assembly. The power assembly includes a housing and a motor and a retarder that are disposed in the housing, and a rotating shaft that is connected to the motor and the retarder through driving. The motor includes a rotor iron core, a stator iron core, and an end winding. The retarder includes a gear set, and the gear set includes a driving gear and a transmission gear. The rotor iron core is fixed to the rotating shaft, and the driving gear is also fixed to the rotating shaft, so that the rotating shaft transfers rotation of the rotor iron core to the driving gear. After being decelerated by using the gear set, driving force of the motor may be output. The housing has an oil storage pool and an oil collection tank. The oil storage pool is located in a bottom area of the housing, and the oil collection tank is at a high location of the housing. Further, the oil collection tank is located on a side that is of the rotating shaft and that is away from the oil storage pool. A part of a structure of at least one first gear in the gear set is located in the oil storage pool. When the gear set rotates, the first gear may bring out cooling oil in the oil storage pool and throw the cooling oil into the oil collection tank. The rotating shaft has a cooling oil channel inside, the oil collection tank communicates with the cooling oil channel, and the cooling oil that is collected in the oil collection tank and that is brought by the gear may flow to the cooling oil channel, to dissipate heat from the rotor iron core. In this solution, the power assembly further includes an oil-pumping system. The oil-pumping system includes an oil pump. The oil pump has an oil inlet channel and an oil outlet channel. The oil inlet channel communicates with the oil storage pool, and the oil outlet channel communicates with the cooling oil channel. Therefore, the oil pump may pump the cooling oil in the oil storage pool into the cooling oil channel, to dissipate heat from the rotor iron core.

The power assembly in the technical solution in this application includes two oil paths for dissipating heat from the rotor iron core. An oil path 1 is driven by the gear. The gear set rotates to drive the cooling oil in the oil storage pool to be raised and collected in the oil collection tank at a high location. Then, the cooling oil in the oil collection tank flows to the cooling oil channel in the rotating shaft, to dissipate heat from the rotor iron core. An oil path 2 is driven by the oil pump. The oil pump pumps the cooling oil in the oil storage pool into the cooling oil channel in the rotating shaft, to dissipate heat from the rotor iron core. When a rotation speed of the gear set is relatively slow, there is less or no cooling oil in the oil path 1, and the oil path 2 may be used to dissipate heat from the rotor iron core, to ensure a heat dissipation effect of the rotor iron core when the rotation speed of the gear set is relatively slow. Alternatively, when the rotation speed of the gear set is relatively fast, an amount of heat generated by the rotor iron core is relatively large, an amount of oil supplied by the oil path 2 is relatively fixed, and a cooling effect is insufficient. In this case, the oil path 1 collects a relatively large amount of oil when the rotation speed of the gear is fast, and can improve a heat dissipation effect of the rotor iron core. Therefore, in this application, cooling requirements of the rotor iron core during high-speed operation and low-speed operation of the power assembly both may be met, to improve a cooling effect of the rotor iron core of the power assembly.

The cooling oil channel penetrates through the rotor iron core in an axial direction of the rotor iron core, to increase a contact area between the cooling oil and the rotor iron core, thereby improving a heat dissipation effect of the rotor iron core.

To implement communication between the oil collection tank and the cooling oil channel of the rotating shaft, a first oil channel is connected between the oil collection tank and the cooling oil channel, and the cooling oil in the oil collection tank flows to the cooling oil channel of the rotating shaft through the first oil channel. Further, the oil collection tank is at a high location of the cooling oil channel, so that the cooling oil flows to the cooling oil channel from the oil collection tank by using gravity. A specific manner of communication between the oil outlet channel of the oil pump and the cooling oil channel of the rotating shaft is not limited.

To implement communication between the oil outlet channel of the oil pump and the cooling oil channel, the oil outlet channel of the oil pump can be connected to the oil collection tank. To be specific, the oil pump pumps the cooling oil in the oil storage pool into the oil collection tank, and then the cooling oil flows to the cooling oil channel of the rotating shaft through the first oil channel, to simplify a structure of an end of the cooling oil channel. Alternatively, the oil outlet channel of the oil pump may be directly connected to the cooling oil channel. To be specific, an oil outlet of the oil outlet channel of the oil pump is directly connected to the cooling oil channel, which helps increase an amount of cooling oil flowing to the cooling oil channel. Alternatively, the oil outlet channel of the oil pump may be connected to the first oil channel. To be specific, the oil outlet of the oil outlet channel of the oil pump is located on a sidewall of the first oil channel, and the cooling oil enters the first oil channel from the oil outlet channel of the oil pump, and then flows to the cooling oil channel, to dissipate heat from the rotor iron core. Further, a manner of communication between the oil outlet channel of the oil pump and the cooling oil channel may be selected based on a requirement.

A flow valve may be further disposed in the oil outlet channel of the oil pump, to adjust an amount of cooling oil in the oil outlet channel. In practical application, a cooling requirement of the rotor iron core varies with a change of a working state of the power assembly. When the rotor iron core generates a relatively large amount of heat, an opening degree of the flow valve may be increased, to increase an amount of cooling oil flowing to the cooling oil channel, thereby improving a cooling effect. Alternatively, when the rotor iron core generates a relatively small amount of heat, the opening degree of the flow valve can be decreased, to decrease the amount of cooling oil flowing to the cooling oil channel, and divert, to another cooling path, a relatively large part of the cooling oil pumped out by the oil pump, thereby improving an overall cooling effect.

To improve a cooling effect of the power assembly, a heat exchanger may be disposed in the oil-pumping system, to decrease a temperature of the cooling oil pumped out of the oil storage pool by the oil-pumping system, thereby improving a cooling effect. When the heat exchanger is disposed, the heat exchanger may be disposed in the oil inlet channel of the oil pump, or may be disposed in the oil outlet channel of the oil pump, provided that a disposing location of the heat exchanger is selected based on a product layout.

In a process of cyclically using the cooling oil, specific contamination is caused, and there are impurities in the cooling oil. The oil-pumping system in this application may further include a filter, to improve cleanliness of cooling oil that passes through the oil-pumping system, thereby prolonging a service life of the power assembly. When the filter is disposed, the filter is disposed in the oil inlet channel of the oil pump, so that the cooling oil can be filtered as early as possible when entering the oil-pumping system.

To increase an amount of cooling oil collected in the oil collection tank, a flow guiding tank may be disposed between the oil collection tank and the first gear, so that when the first gear rotates, the cooling oil brought out of the oil storage pool flows to the oil collection tank along the flow guiding tank, and the oil collection tank may collect more cooling oil, thereby improving a cooling effect.

An outer wall that is of the oil collection tank and that faces a direction of the flow guiding tank is an arc-shaped surface, so that the cooling oil in the flow guiding tank flows to the oil collection tank along the arc-shaped surface, which can also increase the amount of cooling oil collected in the oil collection tank.

An inner wall at an end that is of the cooling oil channel and that is close to an oil inlet may further have a helical guiding channel, and the cooling oil may flow to the cooling oil channel along the helical guiding channel. Further, the cooling oil enters the helical guiding channel. As the rotating shaft rotates, the cooling oil is driven by the helical guiding channel to flow towards the deep of the cooling oil channel, to increase an amount of cooling oil entering the cooling oil channel.

When the helical guiding channel is disposed, the helical guiding channel may be disposed in a part of an area on a side of the oil inlet of the cooling oil channel. Alternatively, the helical guiding channel may penetrate through the cooling oil channel. To be specific, the inside of the cooling oil channel all is the helical guiding channel, to improve a speed at which the cooling oil flows in the cooling oil channel, thereby improving a cooling speed of the rotor iron core.

Because the cooling oil in the (A-pumping system enters the cooling oil channel under driving of the oil pump, the cooling oil has driving force and can relatively quickly flow to the cooling oil channel. Therefore, an end of the oil outlet channel of the oil pump may extend into the cooling oil channel for a specified distance, and an outer wall of a part that is of the oil outlet channel and that extends into the cooling oil channel may be spaced from the helical guiding channel by a specified distance in a radial direction. In this solution, the cooling oil in the oil collection tank flows to the cooling oil channel from a gap between the oil outlet channel and the helical guiding channel, so that the cooling oil can directly enter the helical guiding channel. In this solution, an amount of cooling oil entering the helical guiding channel may be increased, thereby improving a guiding effect of the helical guiding channel.

To enrich functions of the oil collection tank, the cooling oil in the oil collection tank may be further used as lubricant for the gear set. Further, the oil collection tank may be connected to a second oil channel, and an oil outlet of the second oil channel may be opposite to the gear set, so that the cooling oil in the oil collection tank may flow to the gear set through the second oil channel, to lubricate the gear set. The oil collection tank may be connected to at least two second oil channels, so that oil outlets of the at least two second oil channels are respectively opposite to engaged gears.

The oil collection tank may be further connected to a third oil channel, and an oil outlet of the third oil channel may be opposite to a bearing, so that the cooling oil in the oil collection tank may flow to the bearing through the third oil channel, to lubricate the bearing. The oil collection tank may be connected to at least two third oil channels, so that oil outlets of the at least two third oil channels are respectively opposite to bearings.

The power assembly further includes a stator iron core and an end winding. The stator iron core has a cooling channel. The oil collection tank may further have a fourth oil channel. The fourth oil channel communicates with the cooling oil channel, so that the cooling oil in the oil collection tank flows to the cooling channel through the fourth oil channel, to dissipate heat from the stator iron core and the end winding. In this solution, in addition to being cooled by the cooling oil in the oil-pumping system, the stator iron core and the end winding may be cooled by the cooling oil in the oil collection tank, so that a cooling effect is relatively good, which helps improve cooling efficiency of the power assembly.

According to a second aspect, this application further provides an electric vehicle. The electric vehicle includes the power assembly in any one of the foregoing technical solutions, and the power assembly is connected to a wheel of the electric vehicle by using a transmission apparatus through driving, to drive the electric vehicle to travel. In this solution, the power assembly includes two oil paths for dissipating heat from the rotor iron core, so that cooling requirements of the rotor iron core during high-speed operation and low-speed operation of the power assembly both may be met, to improve a cooling effect of the rotor iron core of the power assembly, thereby improving performance of the electric vehicle and prolonging a service life of the electric vehicle.

DESCRIPTION OF EMBODIMENTS

Description of Reference Numerals

| 1-power assembly; | 11-housing; |
| 111-oil storage pool; | 112-oil collection tank; |
| 1121-tank opening; | 1122-outer wall surface; |
| 1123-baffle; | 113-flow guiding tank; |
| 1131-flow guiding wall; | 12-motor; |

-continued

| 121-stator iron core; | 122-rotor iron core; |
| 123-end winding; | 13-retarder; |
| 131-gear set; | 1311-driving gear; |
| 1312-first gear; | 14-rotating shaft; |
| 141-cooling oil channel; | 142-first shaft segment; |
| 143-second shaft segment; | 1411-helical guiding channel; |
| 15-first oil channel; | 151-second oil channel; |
| 152-third oil channel; | 153-fourth oil channel; |
| 16-oil outlet channel; | 161-flow valve; |
| 17-oil pump; | 18-heat exchanger; |
| 19-filter; | 20-oil inlet channel; |
| 2-transmission apparatus; and | 3-wheel. |

To make objectives, technical solutions, and advantages of this disclosure clearer, the following further describes this disclosure in detail with reference to the accompanying drawings.

To facilitate understanding of a power assembly and an electric vehicle provided in the embodiments of this disclosure, an application scenario of the power assembly and the electric vehicle is described below. The power assembly serves as a power system of the electric vehicle, to provide driving force for traveling of the electric vehicle. Performance of the power assembly directly affects performance of the electric vehicle, and the power assembly generates a large amount of heat in a working process. Therefore, it is particularly important to improve heat dissipation performance of the power assembly. For problems that heat dissipation effect generated when a water-cooled heat dissipation technology is used is poor, a high requirement is imposed on structure precision, and so on, currently, oil-cooled heat dissipation is gradually used to replace water-cooled heat dissipation in some power assemblies. Further, a cooling oil channel used to dissipate heat from the power assembly is disposed inside a rotating shaft of a rotor iron core of the power assembly. Then, cooling oil accumulated in a housing is raised through rotation of a gear, and the cooling oil is guided into the cooling oil channel inside the rotating shaft. The cooling oil flows in the cooling oil channel with rotation of a rotor and is finally sprayed from the cooling oil channel under a centrifugal function during rotation of the rotor, to implement heat dissipation. However, when a motor operates at a low speed, it is difficult for the gear to raise the cooling oil, and consequently heat cannot be dissipated from the rotor. Alternatively, when the motor operates at a high speed, the cooling oil in the housing has a relatively high temperature, the cooling oil enters the cooling oil channel inside the rotor, and a cooling effect is relatively poor. In short, in the conventional technology, the power assembly has a relatively poor heat dissipation effect. Based on this, the embodiments of this disclosure provide a power assembly and an electric vehicle, to improve a heat dissipation effect of a rotor of the power assembly, thereby improving working stability of the power assembly of the electric vehicle, prolonging a service life of the power assembly, and prolonging a service life of the electric vehicle.

Figure 1:
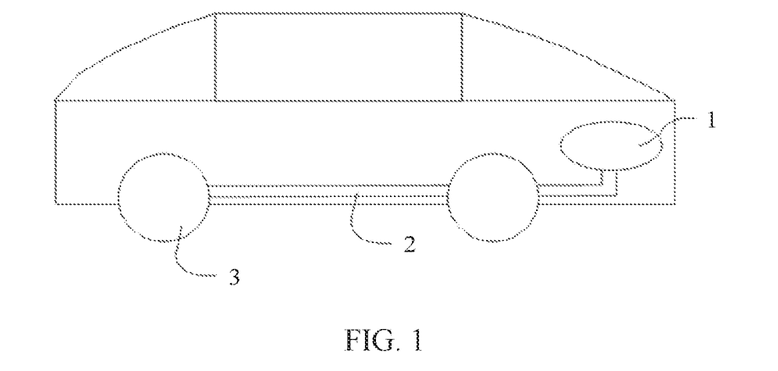
FIG. 1 is a schematic diagram of a structure of an electric vehicle according to an embodiment of this disclosure.

First, FIG. 1 is a schematic diagram of a structure of an electric vehicle according to an embodiment of this disclosure. Referring to FIG. 1, this embodiment of this disclosure provides an electric vehicle. The electric vehicle includes a power assembly 1 in the foregoing embodiment, and also includes a transmission apparatus 2 and a wheel 3. The power assembly 1 is connected to the transmission apparatus 2 through driving, and the transmission apparatus 2 is also connected to the wheel 3 through driving, so that driving force output by the power assembly 1 can be transferred to the driving wheel 3 by using the transmission apparatus 2, to drive the electric vehicle to travel. The power assembly 1 has a relatively good heat dissipation effect of a rotor, and the power assembly 1 has a relatively high working stability and a relatively long service life. Therefore, power performance of the electric vehicle may be improved, and a service life of the electric vehicle may be prolonged.

Figure 2:
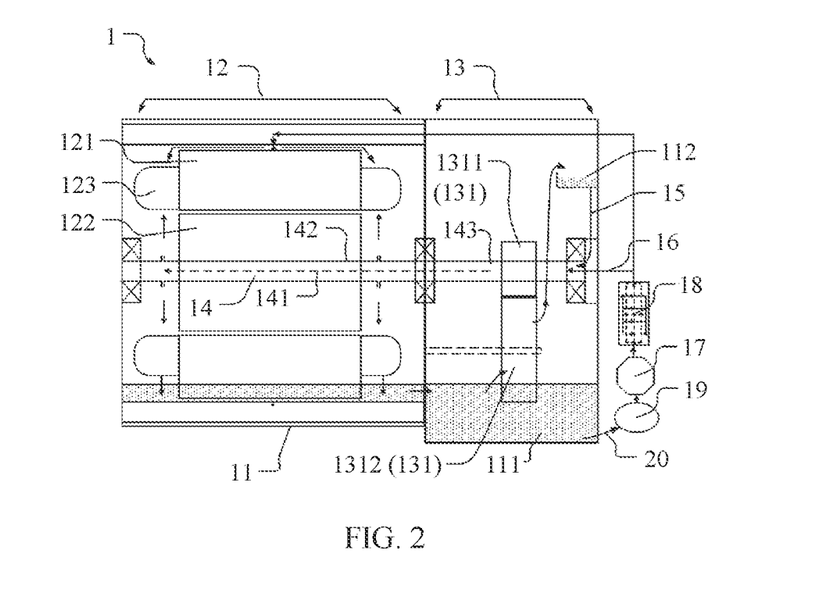
FIG. 2 is a schematic diagram of a structure of a power assembly according to an embodiment of this disclosure.

For a specific structure of the power assembly 1 provided in this disclosure, refer to FIG. 2. FIG. 2 is a schematic diagram of a structure of a power assembly according to an embodiment of this disclosure. The power assembly 1 includes a housing 11, and a motor 12 and a retarder 13 that are disposed in the housing 11, and a rotating shaft 14 connected to the motor 12 and the retarder 13 through driving. The motor 12 includes a stator iron core 121, an end winding 123, and a rotor iron core 122. The end winding 123 is disposed in the stator iron core 121, and the stator iron core 121 is disposed opposite to the rotor iron core 122. The rotating shaft 14 includes a first shaft segment 142 and a second shaft segment 143 that are fixedly connected, where the first shaft segment 142 is fixedly assembled in the rotor iron core 122. Further, the rotor iron core 122 may be coaxially disposed with the first shaft segment 142. The retarder 13 includes a gear set 131. The second shaft segment 143 is fixedly assembled with a driving gear 1311 in the gear set 131, so that the rotor iron core 122 drives the gear set 131 to drive. The gear set 131 of the retarder 13 may decelerate rotation that is output by the motor 12. The housing 11 has an oil storage pool 111 at a bottom opposite to the gear set 131 and an oil collection tank 112 disposed at a high location. The oil collection tank 112 is located in a direction that is of the rotating shaft 14 and that is away from the oil storage pool 111. The housing 11 of the power assembly 1 has cooling oil for cooling and lubricating, and the cooling oil is stored in the oil storage pool 111. A part of a structure of the gear set 131 is located in the oil storage pool 111. Further, a partial part of a first gear 1312 in the gear set 131 may be located in the oil storage pool 111. The rotating shaft 14 has a cooling oil channel 141 inside. The cooling oil channel 141 extends into the rotor iron core 122. The oil collection tank 112 communicates with the cooling oil channel 141. The power assembly 1 further includes an oil-pumping system. The oil-pumping system includes an oil pump 17. An oil inlet channel 20 of the oil pump 17 communicates with the oil storage pool 111, and an oil outlet channel 16 of the oil pump 17 communicates with the cooling oil channel 141. The power assembly forms two oil paths for dissipating heat from the rotor iron core 122. An oil path 1 means the following: When the gear set 131 rotates, gear teeth of the first gear 1312 drives the cooling oil in the oil storage pool 111 to be raised, and the oil collection tank 112 at a high location may collect the cooling oil brought by the first gear 1312. Because the oil collection tank 112 communicates with the cooling oil channel 141, the cooling oil collected in the oil collection tank 112 may flow to the cooling oil channel 141, to dissipate heat from the rotor iron core 122. An oil path 2 means the following: The oil pump 17 pumps the cooling oil in the oil storage pool 111 into the cooling oil channel 141, to dissipate heat from the rotor iron core 122.

In this solution, the following two cooling manners are used to dissipate heat from the rotor iron core 122 of the power assembly 1: The oil path 1 driven by the gear set 131 is used to take oil out, and the oil path 2 driven by the oil pump 17 is used to take oil in. When a rotation speed of the gear set 131 is relatively slow, it is difficult to drive the cooling oil in the oil storage pool 111 to enter the oil collection tank 112. In this case, the oil pump 17 may pump oil to dissipate heat from the rotor, to ensure a heat dissipation effect of the rotor at a low rotation speed. Alternatively, when the rotation speed of the gear set is relatively high, an amount of generated heat is also relatively large. In this case, because an amount of oil pumped by the oil pump 17 is relatively fixed, it is difficult for an amount of oil allocated to the cooling oil channel 141 of the rotor iron core 122 to meet a heat dissipation requirement, and consequently a cooling effect of using only the oil pump 17 to take oil in is not ideal. However, in this case, because the rotation speed of the gear set 131 is relatively high, more cooling oil may be brought to the oil collection tank 112, and enter the cooling oil channel 141, thereby improving a cooling effect. Therefore, in this disclosure, cooling requirements of the rotor iron core 122 during high-speed operation and low-speed operation of the power assembly 1 both may be met, to improve a cooling effect of the rotor iron core 122 of the power assembly 1.

In addition to being used to dissipate heat from the rotor iron core 122, the oil-pumping system may be further used to dissipate heat from the stator iron core 121 and the end winding 123. Further, the oil-pumping system includes two branches for separately delivering cooling oil to the rotor iron core 122, and the stator iron core 121 and the end winding 123. When the oil-pumping system drives the cooling oil to spray the stator iron core 121, the cooling oil flows on a surface of the stator iron core 121 and flows to the end winding 123, to dissipate heat from the stator iron core 121 and the end winding 123.

Figure 3:
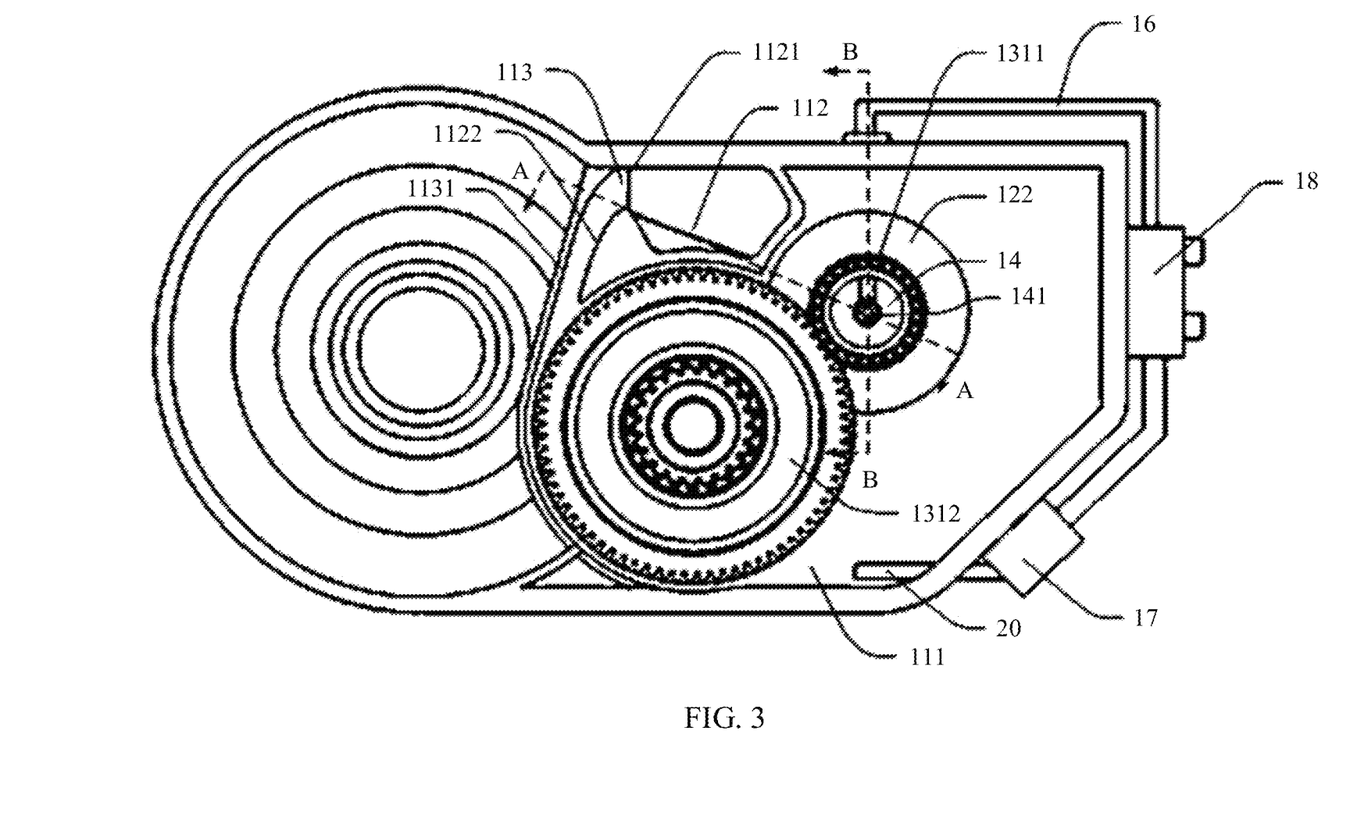
FIG. 3 is a schematic diagram of a cross-sectional structure of a power assembly according to an embodiment of this disclosure.
Figure 4:
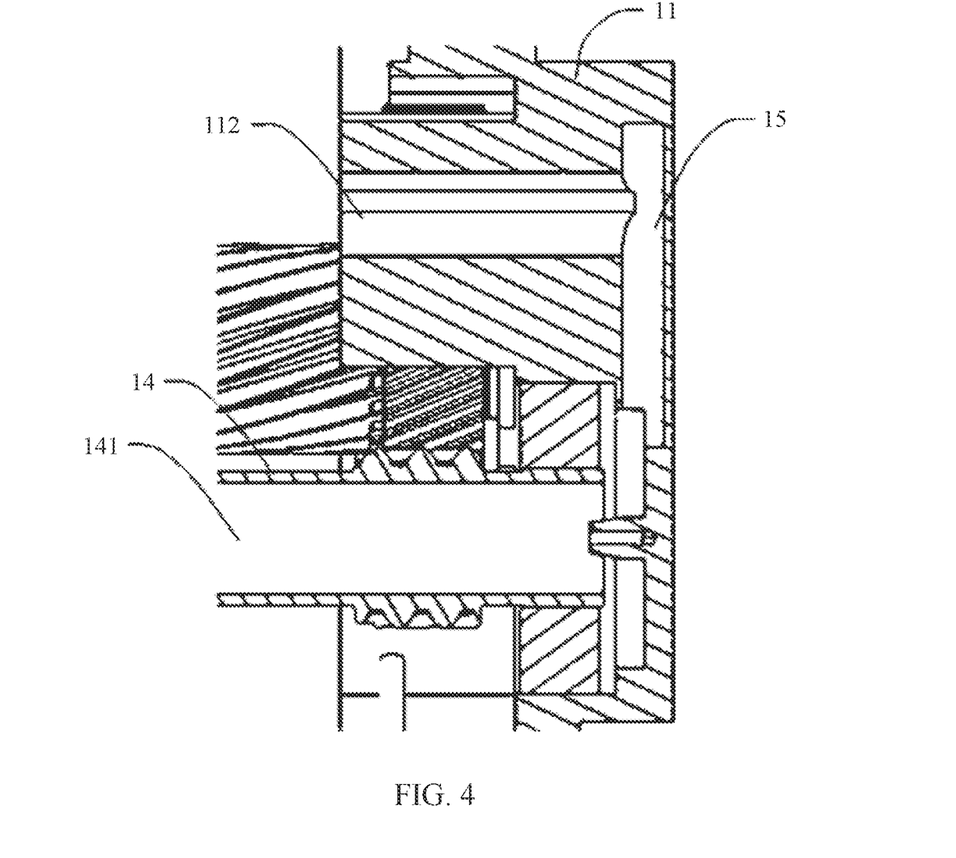
FIG. 4 is a schematic diagram of a partial cross-sectional structure at A-A in FIG. 3.

With reference to FIG. 3 and FIG. 4, FIG. 3 is a schematic diagram of a cross-sectional structure of a power assembly according to an embodiment of this disclosure, and FIG. 4 is a schematic diagram of a partial cross-sectional structure at A-A in FIG. 3. To implement communication between the oil collection tank 112 and the cooling oil channel 141 in the rotating shaft 14, a first oil channel 15 may be disposed between the oil collection tank 112 and the cooling oil channel 141. One end of the first oil channel 15 is located at a bottom of the oil collection tank 112, that is, the oil collection tank 112 faces an end of the oil storage pool 111, so that the cooling oil in the oil collection tank 112 flows to the first oil channel 15 under gravity. The other end of the first oil channel 15 communicates with the cooling oil channel 141, so that the cooling oil in the oil collection tank 112 enters the cooling oil channel 141 through the first oil channel 15, to cool the rotor iron core 122. When the first oil channel 15 is disposed, an oil tank may be disposed in the housing 11 to form the first oil channel 15. Alternatively, an oil pipe may be disposed to be connected between the bottom of the oil collection tank 112 and the cooling oil channel 141.

Figure 5:
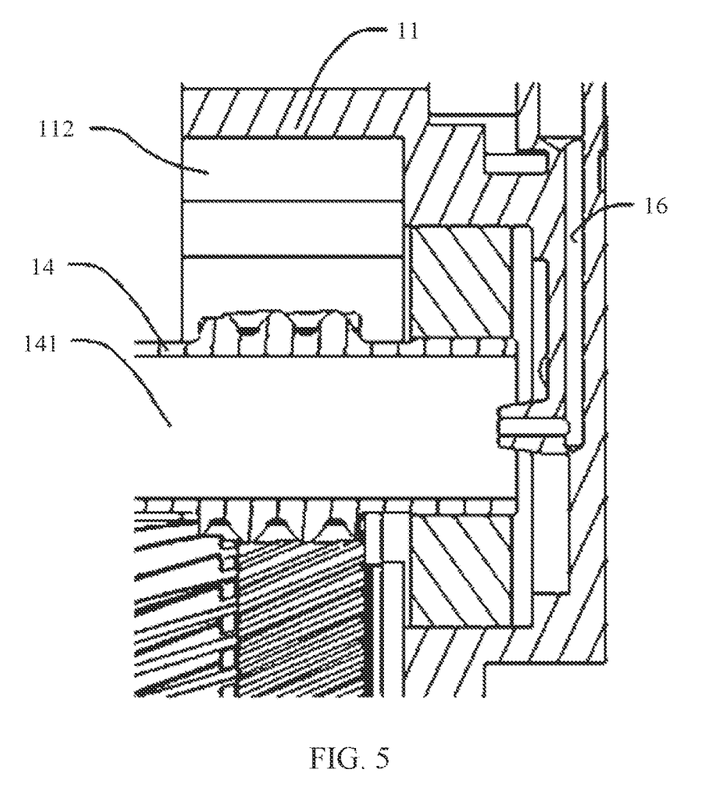
FIG. 5 is a schematic diagram of a partial cross-sectional structure at B-B in FIG. 3.

Referring to FIG. 3 and FIG. 5, FIG. 5 is a schematic diagram of a partial cross-sectional structure at B-B in FIG. 3. One end of the oil pump 17 communicates with the oil storage pool 111 by using the oil inlet channel 20, and the other end communicates with the cooling oil channel 141 by using the oil outlet channel 16. The oil inlet channel 20 may be a pipe, or may include a part of a communicated pipe and a part of an oil tank located in the housing 11. The oil outlet channel 16 may be a pipe, or may include a part of a communicated pipe and a part of an oil tank located in the housing 11. Specific structures of the oil inlet channel 20 and the oil outlet channel 16 may be designed based on a requirement.

Figure 6:
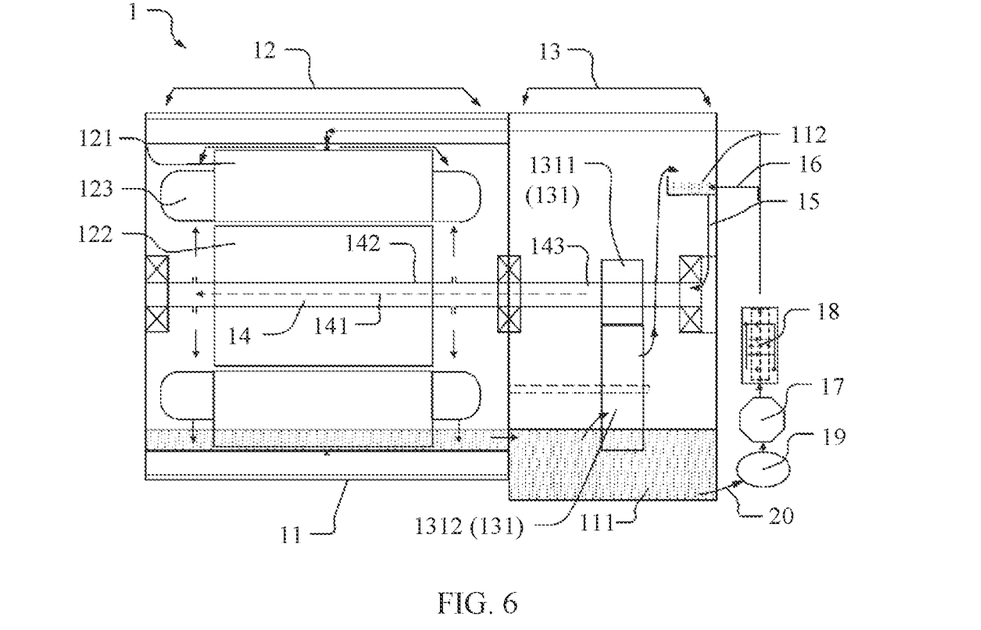
FIG. 6 is a schematic diagram of another structure of a power assembly according to an embodiment of this disclosure.
Figure 7:
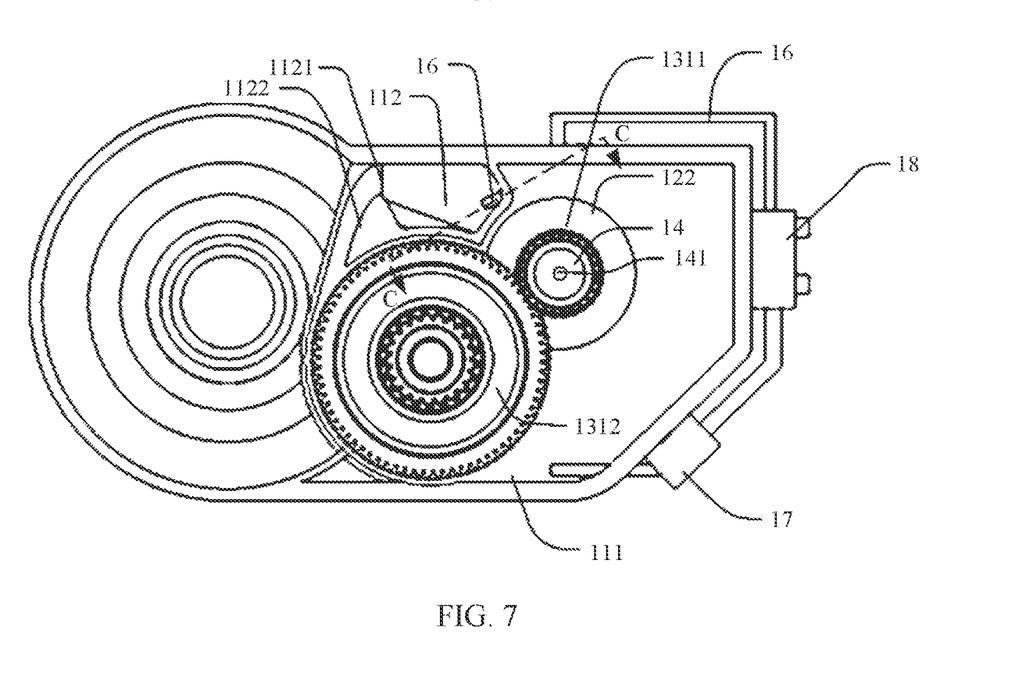
FIG. 7 is a schematic diagram of another cross-sectional structure of a power assembly, according to an embodiment of this disclosure.
Figure 8:
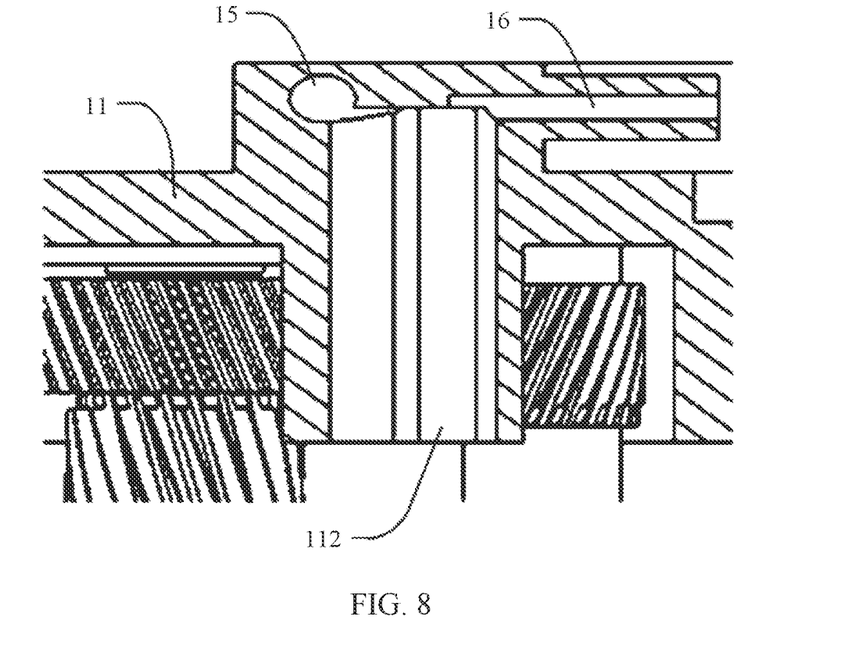
FIG. 8 is a schematic diagram of a partial cross-sectional structure at C-C in FIG. 7.

When the oil outlet channel 16 of the oil pump 17 is disposed, a manner of communication between the oil outlet channel 16 and the cooling oil channel 141 of the rotating shaft 14 is not limited. Referring to FIG. 6 to FIG. 8, the oil outlet channel 16 of the oil pump 17 may be connected to the oil collection tank 112. To be specific, the cooling oil in the oil storage pool 111 is first pumped into the oil collection tank 112 by using the oil pump 17, and then flows to the cooling oil channel 141 through the first oil channel 15 that communicates with the oil collection tank 112, to dissipate heat from the rotor iron core 122. In this solution, a structure of an end of the cooling oil channel 141 of the rotating shaft 14 may be simplified, and a precision requirement for communicating the oil outlet channel 16 with the oil collection tank 112 is relatively low. Alternatively, referring to FIG. 2 and FIG. 5, in another implementation, the oil outlet channel 16 of the oil pump 17 may be directly connected to the cooling oil channel 141 of the rotating shaft 14, so that the cooling oil in the oil storage pool 111 is directly pumped into the cooling oil channel 141. A maximum flow of cooling oil passing through the first oil channel 15 is limited. Therefore, when the cooling oil is pumped into the oil collection tank 112 and then flows to the cooling oil channel 141 through the first oil channel 15, a maximum cooling capability of the rotor iron core 122 is limited by the maximum flow of the first oil channel 15 and is difficult to be further improved. The cooling oil in the oil storage pool 111 is directly pumped into the cooling oil channel 141 by using the oil pump 17, so that even if an amount of oil flowing from the oil collection tank 112 to the cooling oil channel 141 through the first oil channel 15 reaches the maximum, the oil pump 17 can still pump 17 the cooling oil in the oil storage pool 111 into the cooling oil channel 141, to improve a cooling effect of the rotor iron core 122. Alternatively, referring to FIG. 9, in another implementation, the oil outlet channel 16 may be connected to the first oil channel 15. To be specific, an oil outlet of the oil outlet channel 16 is disposed on a sidewall of the first oil channel 15, so that the cooling oil pumped out by the oil pump 17 first enters the first oil channel 15, and then flows to the cooling oil channel 141 through the first oil channel 15.

It should be noted that in this embodiment of this disclosure, that two structures "communicate" means the following: Cooling oil may flow between the two structures, but an intermediate structure may be further disposed. However, that two structures are "connected" means the following: The two structures are directly connected and the cooling oil may flow between the two structures.

Figure 9:
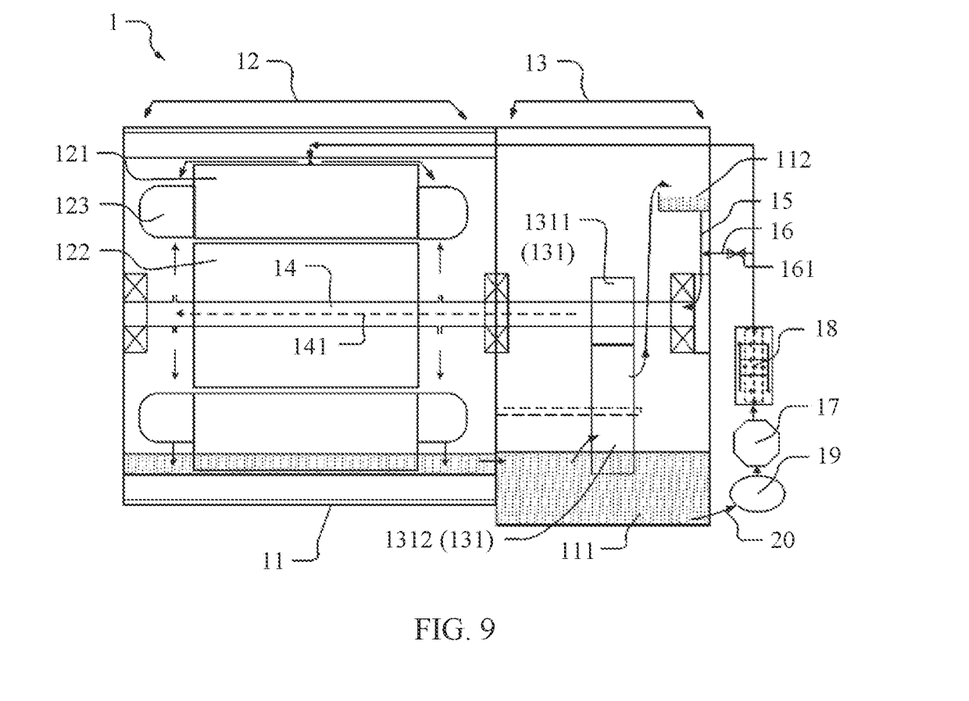
FIG. 9 is a schematic diagram of another structure of a power assembly according to an embodiment of this disclosure.

Still referring to FIG. 9, a flow valve 161 may be disposed in the oil outlet channel 16, to adjust an amount of cooling oil pumped into the cooling oil channel 141 by using the oil pump 17. When an amount of heat generated by the rotor is relatively small, an amount of required cooling oil is also relatively small. In this case, the flow valve 161 may be controlled to decrease an opening degree. Alternatively, when the amount of heat generated by the rotor is relatively large, the amount of required cooling oil is also relatively large. In this case, the flow valve 161 may be controlled to increase the opening degree. Generally, a part of the cooling oil pumped out by the oil pump 17 is used to dissipate heat from the rotor iron core 122, and the remaining part may be further used to dissipate heat from structures such as the stator iron core 121 and the end winding 123. In this solution, distribution conditions that are of the cooling oil pumped out by the oil pump 17 and that are in different parts may be adjusted based on a working condition of the power assembly 1. For example, when a rotation speed of the rotor is decreased, or when a temperature of the rotor is decreased, or when an output torque is decreased, an amount of cooling oil in the rotor iron core 122 is decreased, so that an amount of cooling oil in a remaining part (such as a stator) may be increased. Alternatively, when the rotation speed of the rotor is increased, or when the temperature of the rotor is increased, or when the output torque is increased, the amount of cooling oil in the rotor iron core 122 is increased, so that the amount of cooling oil in the remaining part is decreased. In this way, dynamic balance of distribution that is of the cooling oil pumped out by the oil pump 17 and that is in different parts is achieved, so that the power assembly 1 achieves a relatively good cooling effect as a whole.

It should be noted that a principle for adjusting the flow valve 161 is merely a simplified adjustment example. Further, the principle for adjusting the flow valve 161 may be set based on an actual working condition of the power assembly 1. The power assembly 1 may include a control system. The control system adjusts the flow valve 161 based on a specified condition, to automatically control a distribution condition of the cooling oil pumped out by the oil pump 17. Further, the flow valve 161 may be a solenoid valve, to improve an automatic control effect of the flow valve 161.

Referring to FIG. 3, when the oil collection tank 112 is disposed, a flow guiding tank 113 may be disposed between the oil collection tank 112 and the first gear 1312, so that the cooling oil brought out by the first gear 1312 flows to the oil collection tank 112 along the flow guiding tank 113, to increase an amount of cooling oil collected in the oil collection tank 112. Further, one side of the flow guiding tank 113 may be an outer wall surface 1122 that is of the oil collection tank 112 and that is adjacent to a tank opening 1121, and the other side may be a flow guiding wall 1131 located in the housing 11. Further, the flow guiding tank 113 may be formed by adding a flow guiding rib and the outer wall surface 1122 of the oil collection tank 112 to the housing 11, Alternatively, the housing 11 has a cavity for installing the first gear 1312, and the flow guiding tank 113 and the oil collection tank 112 are disposed on the housing 11 through digging. The outer wall surface 1122 of the oil collection tank 112 is an arc surface, and has a relatively good flow guiding effect, so that the cooling oil brought by the first gear 1312 enters the oil collection tank 112 along the arc surface. A bottom wall of the oil collection tank 112 is an inclined surface. The inclined surface may be an inclined plane, or may be an arc-shaped surface. A connection area between the first oil channel 15 and the oil collection tank 112 is located at a lowest point of the inclined surface, that is, at a location that is of the bottom wall of the oil collection tank 112 and that is closest to the rotating shaft 14, so that even if an amount of oil in the oil collection tank 112 is relatively small, the oil can flow out of the first oil channel 15.

Referring to FIG. 2, when the cooling oil channel 141 is disposed, the cooling oil channel 141 may penetrate through the rotor iron core 122 in an axial direction of the rotor iron core 122, to enlarge an area in which the cooling oil channel 141 dissipates heat from the rotor iron core 122, thereby improving a heat dissipation effect of the rotor iron core 122. The rotating shaft 14 may further include an oil outlet branch disposed in a radial direction of the rotating shaft 14. The oil outlet branch communicates with the cooling oil channel 141, and the cooling oil in the cooling oil channel 141 may be thrown out of the oil outlet branch as the rotating shaft 14 rotates. To fully use the cooling oil, two oil outlet branches may be disposed in an axial direction of the rotating shaft 14.

The two oil outlet branches are respectively opposite to the end windings 123 extending out of the stator iron core 121, so that the cooling oil thrown out of the cooling oil channel 141 can dissipate heat from the end windings 123, thereby fully using the cooling oil to dissipate heat.

Still referring to FIG. 2, the oil-pumping system may further include a heat exchanger 18. The oil pump 17 drives the cooling oil in the oil storage pool 111 to flow through the heat exchanger 18 for cooling and then flow to the cooling oil channel 141, to dissipate heat from the rotor iron core 122 by using the cooling oil with a relatively low temperature. After cooling and lubricating the motor 12 and the retarder, a temperature of the cooling oil in the oil storage pool 111 increases, and a cooling effect decreases. After being cooled by the heat exchanger 18, the cooling oil has a relatively good effect in cooling the power assembly 1. When the heat exchanger 18 is disposed, the heat exchanger 18 may be a relatively common oil/water heat exchanger 18, and certainly may be another type of heat exchanger 18. This is not limited in this disclosure.

After the cooling oil is cyclically used, there are impurities inside the cooling oil. As shown in FIG. 2, the oil-pumping system may further include a filter 19, to filter the cooling oil in the oil storage pool 111. When the filter 19 is disposed, the filter 19 may be adjacent to the oil storage pool 111. To be specific, the cooling oil in the oil storage pool 111 may first pass through the filter 19, and then pass through the oil pump 17 to enter the heat exchanger 18, to output clean cooling oil with a relatively low temperature.

Figure 10A:
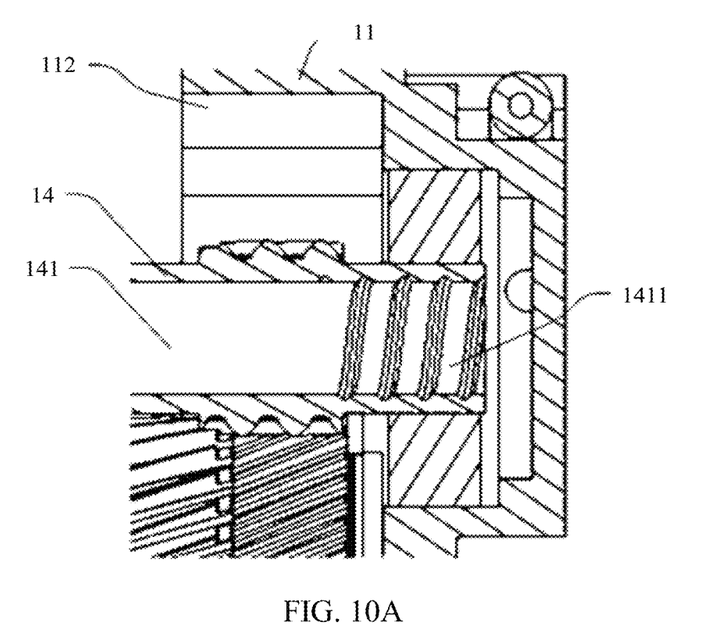
FIGS. 10A-10B are schematic diagrams of a partial cross-sectional structure of a power assembly according to various embodiments of this disclosure.

When the cooling oil channel 141 is used to dissipate heat from the rotor iron core 122, the cooling oil flows to the cooling oil channel 141 from an inlet of the cooling oil channel 141. When the cooling oil flows in the cooling oil channel 141 and is thrown out, heat of the rotor iron core 122 may be taken away, to dissipate heat from the rotor iron core 122. FIG. 10A is a schematic diagram of a partial cross-sectional structure of the cooling oil channel 141 according to an embodiment of this disclosure. To increase an amount of cooling oil entering the cooling oil channel 141, a helical guiding channel 1411 may be disposed on a sidewall at an end that is of the cooling oil channel 141 and that faces the inlet, so that the cooling oil enters the cooling oil channel 141 rapidly, thereby increasing the amount of cooling oil entering the cooling oil channel 141. In this solution, when flowing to the inlet of the cooling oil channel 141, the cooling oil enters the helical guiding channel 1411. As the rotating shaft 14 rotates, the cooling oil is driven by the helical guiding channel 1411 in the helical guiding channel 1411, to flow towards the deep of the cooling oil channel 141. In this solution, the cooling oil may quickly enter the cooling oil channel 141, so that the amount of cooling oil entering the cooling oil channel 141 is increased, to improve a heat dissipation effect of the rotor iron core 122. To improve a flow guiding effect of the helical guiding channel 1411 on the cooling oil, a spinning direction of the helical guiding channel 1411 may be opposite to a rotation direction of the rotating shaft 14, so that the cooling oil flows quickly to a cooling oil channel along the helical guiding channel 1411 as the rotating shaft 14 rotates, to improve a cooling effect of the cooling oil channel.

Figure 10B:
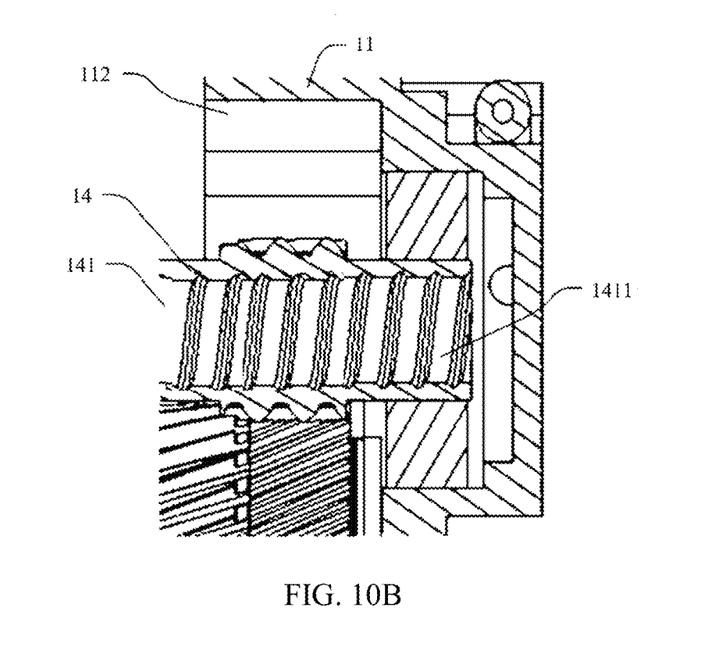

FIG. 10B is a schematic diagram of a partial cross-sectional structure of the cooling oil channel 141 according to an embodiment of this disclosure. When the helical guiding channel 1411 is disposed on the inner wall of the cooling oil channel 141, the helical guiding channel 1411 may be disposed on the inner wall of the entire cooling oil channel 141, to improve a rate and an amount of cooling oil flowing in the cooling oil channel 141, so that a heat dissipation effect of the rotor iron core 122 is relatively good. Alternatively, the helical guiding channel 1411 extending a specific length in the axial direction of the rotating shaft 14 may be disposed at an inlet end of the cooling oil channel 141, to simplify a manufacturing process of the rotating shaft 14.

Figure 11:
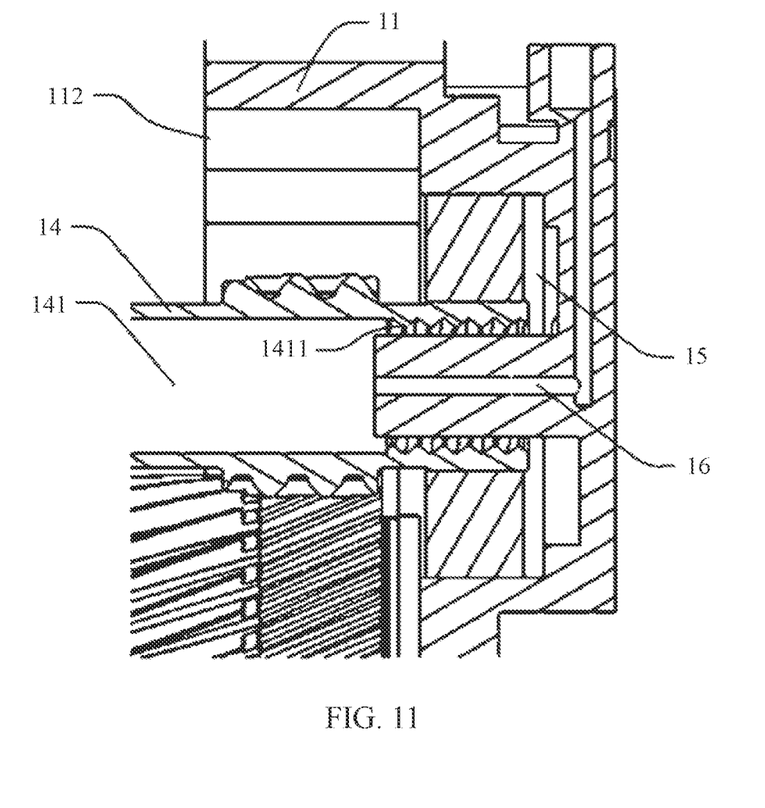
FIG. 11 is a schematic diagram of another partial cross-sectional structure of a power assembly according to an embodiment of this disclosure.

FIG. 11 is a schematic diagram of a partial cross-sectional structure of a cooling oil channel according to an embodiment of this disclosure. When the oil outlet channel 16 of the oil pump 17 is directly connected to the cooling oil channel 141, an end of the oil outlet channel 16 may extend into the cooling oil channel 141. Therefore, a gap between the outer wall of the oil outlet channel 16 and the cooling oil channel 141 is connected to the first oil channel 15. The cooling oil in the oil collection tank 112 enters the gap after passing through the first oil channel 15, and then flows to the cooling oil channel 141. In this solution, the outer wall of the oil outlet channel 16 is spaced from the helical guiding channel 1411 by a specified distance in a radial direction, that is, the gap has a specified width, so that the cooling oil flowing out of the first oil channel 15 may enter the helical guiding channel 1411, which helps the helical guiding channel 1411 to play a role, to increase an amount of cooling oil entering the cooling oil channel 141, thereby improving a cooling effect.

Figure 12:
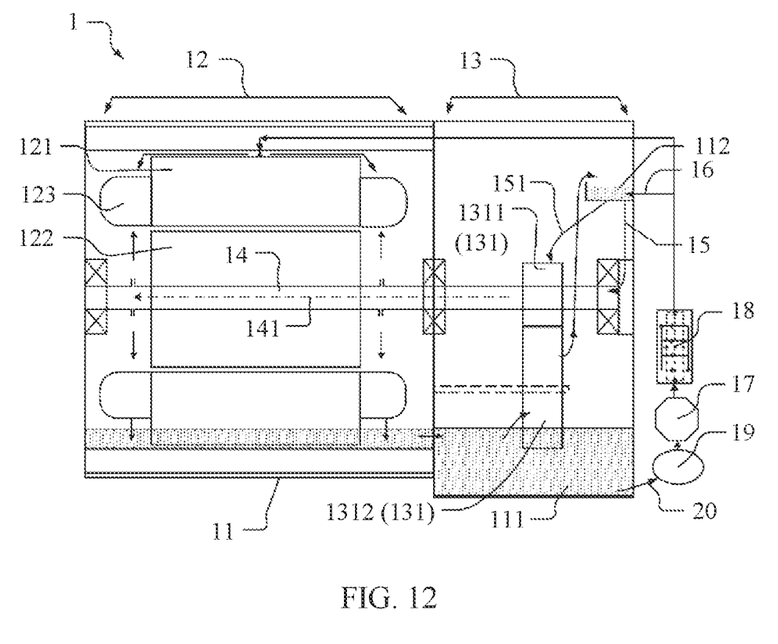
FIG. 12 is a schematic diagram of another structure of a power assembly according to an embodiment of this disclosure.

FIG. 12 is a schematic diagram of another structure of a power assembly according to an embodiment of this disclosure. In a specific embodiment, the cooling oil in the oil collection tank 112 may be further used to provide lubricant to a rotating part in the power assembly 1, for example, lubricating the gear set 131 and a bearing. Referring to FIG. 12, the oil collection tank 112 is further connected to a second oil channel 151. An oil outlet of the second oil channel 151 is opposite to the gear set 131. Therefore, the cooling oil in the oil collection tank 112 may flow to the gear set 131 through the second oil channel 151, to be used to lubricate the gear set 131.

Figure 13:
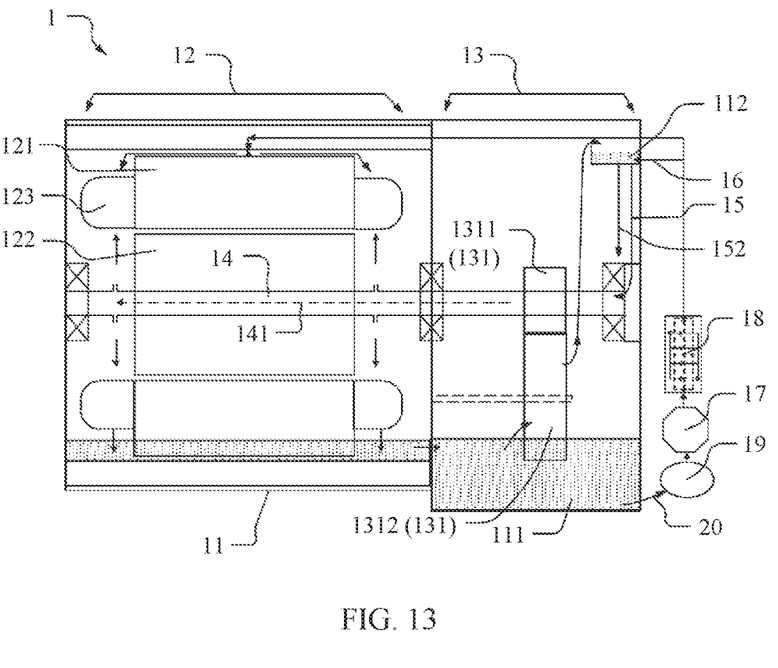
FIG. 13 is a schematic diagram of another structure of a power assembly according to an embodiment of this disclosure.

FIG. 13 is a schematic diagram of another structure of a power assembly according to an embodiment of this disclosure. The oil collection tank 112 may be further connected to a third oil channel 152. An oil outlet of the third oil channel 152 is opposite to the bearing. Therefore, the cooling oil in the oil collection tank 112 may flow to the bearing through the third oil channel 152, to lubricate the bearing. In this embodiment of this disclosure, the disposed oil collection tank 112 may be fully used to enrich functions of the oil collection tank 112. In addition, no additional lubricating oil path needs to be disposed, which helps simplify the structure of the power assembly.

Figure 14:
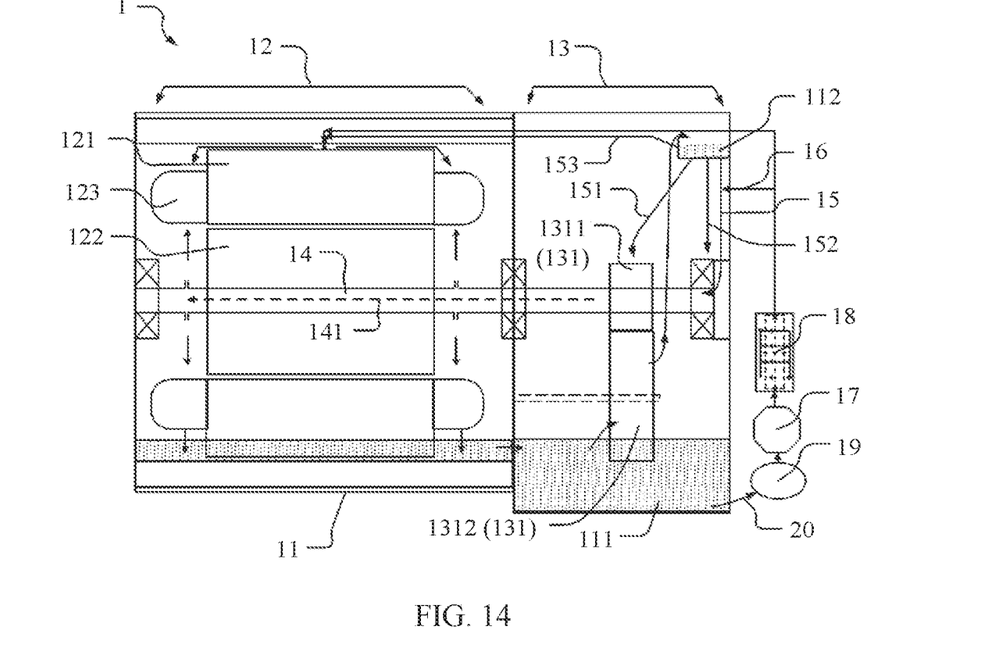
FIG. 14 is a schematic diagram of another structure of a power assembly according to an embodiment of this disclosure.

FIG. 14 is a schematic diagram of another structure of a power assembly according to an embodiment of this disclosure. In a specific embodiment, the cooling oil in the oil collection tank 112 may be further used to provide cooling oil to the stator iron core 121 and the end winding 123 of the power assembly 1. Further, the stator iron core 121 has a cooling oil channel. The oil collection tank communicates with the cooling oil channel by using a fourth oil channel 153, so that, the cooling oil in the oil collection tank 112 may flow to the cooling oil channel through the fourth oil channel 153, to dissipate heat from the stator iron core 121 and the end winding 123, thereby enriching functions of the oil collection tank 112, and improving a heat dissipation effect of the power assembly 1.

Figure 15:
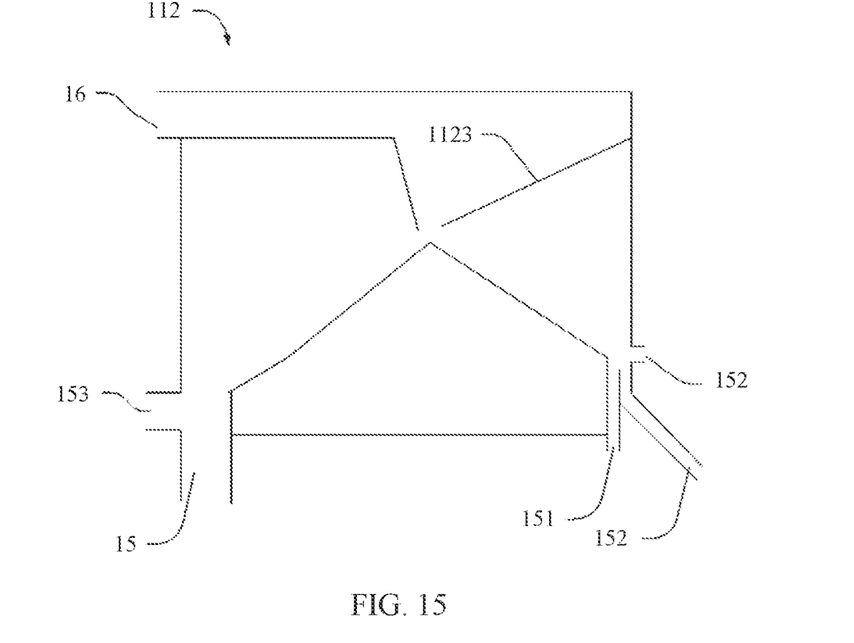
FIG. 15 is a schematic diagram of a structure of an oil collection tank according to an embodiment of this disclosure.

FIG. 15 is a schematic diagram of a structure of an oil collection tank according to an embodiment of this disclosure. In a specific embodiment, the oil collection tank 112 may be connected to the first oil channel 15 and the second oil channel 151, as well as the third oil channel 152 and the fourth oil channel 153, to provide lubricant to both the gear set 131 and the bearing or provide lubricant to the rotor iron core 122, the stator iron core 121, and the end winding 123.

As shown in FIG. 15, a baffle 1123 may be disposed in the oil collection tank 112, to divide the oil collection tank 112 into a plurality of oil areas, so that the cooling oil can flow out of each oil channel connected to the oil collection tank 112. In addition, the oil collection tank 112 may communicate with the oil outlet channel 16 of the oil pump 17, so that the oil pump 17 pumps the cooling oil into the oil collection tank 112. Then the cooling oil is allocated to various parts by using the oil collection tank 112 for lubrication and cooling, to ensure a sufficient amount of cooling oil in the oil collection tank 112.

It should be noted that in this embodiment of this disclosure, the oil collection tank 112 may be connected to one first oil channel 15, or may be connected to at least two first oil channels 15. The oil collection tank 112 may be connected to one second oil channel 151, or may be connected to at least two second oil channels 151. The oil collection tank 112 may be connected to one third oil channel 152, or may be connected to at least two third oil channels 152. The oil collection tank 112 may be connected to one fourth oil channel 153, or may be connected to at least two fourth oil channels 153, Further, a quantity and locations of oil channels may be selected based on a structure of the power assembly 1.

In conclusion, in the technical solutions in this disclosure, for each part that is of the power assembly and that is to be cooled or lubricated by using cooling oil, the cooling oil may be guided, in the following two manners, into the part that is to be cooled: The oil path 1 driven by the gear set is used to take oil out, and the oil path 2 driven by the oil pump is used to take oil in.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A power assembly, comprising:
    a housing comprising an oil storage pool and an oil collection tank;
    a rotor iron core;
    a rotating shaft fixed to the rotor iron core and comprising a cooling oil channel, wherein the cooling oil channel comprises a sidewall at a first end and proximate to an oil inlet, wherein the sidewall comprises helical guiding channel, and wherein the helical guiding channel is configured to transfer cooling oil into the cooling oil channel along the helical guiding channel;
    a first oil channel;
    a gear set comprising:
        a first gear having at least a portion located in the oil storage pool; and
        a driving gear fixed to the rotating shaft; and
    an oil-pumping system disposed in the housing and comprising an oil pump, wherein the oil pump comprises:
        an oil inlet channel that communicates with the oil storage pool; and
        an oil outlet channel coupled to the cooling oil channel, wherein the oil outlet channel comprises:
            a second end that extends into the cooling oil channel; and
            an outer wall spaced from the helical guiding channel by a uniform distance in a radial direction,
    wherein the oil collection tank is located on a side that is of the rotating shaft and that is away from the oil storage pool,
    wherein the oil collection tank is configured to collect the cooling oil from the oil storage pool when the gear set rotates,
    wherein the oil collection tank communicates with the cooling oil channel using the first oil channel, and
    wherein the first oil channel is configured to transfer the cooling oil in the oil collection tank to the cooling oil channel.

2. The power assembly of claim 1, wherein the oil outlet channel is connected to the oil collection tank.

3. The power assembly of claim 1, wherein the oil outlet channel is connected to the cooling oil channel.

4. The power assembly of claim 1, wherein the oil outlet channel is connected to the first oil channel.

5. The power assembly of claim 1, further comprising a flow valve disposed in the oil outlet channel and configured to adjust a flow of the cooling oil in the oil outlet channel.

6. The power assembly of claim 1, wherein the oil-pumping system further comprises a heat exchanger disposed in the oil inlet channel or the oil outlet channel.

7. The power assembly of claim 1, wherein the oil-pumping system further comprises a filter disposed in the oil inlet channel.

8. The power assembly of claim 1, further comprising a flow guiding tank disposed between the oil collection tank and the first gear and configured to guide, to the oil collection tank, the cooling oil from the first gear.

9. The power assembly of claim 8, wherein an outer wall surface that is of the oil collection tank and that faces the flow guiding tank is an arc-shaped surface.

10. The power assembly of claim 1, wherein the helical guiding channel penetrates through the cooling oil channel.

11. The power assembly of claim 1, further comprising a second oil channel coupled to the oil collection tank, wherein an oil outlet of the second oil channel is opposite to the gear set, and wherein the second oil channel is configured to transfer the cooling oil in the oil collection tank to the gear set in order to lubricate the gear set.

12. The power assembly of claim 11, wherein the oil collection tank has a baffle that separates the oil collection tank into a plurality of oil areas.

13. The power assembly of claim 1, further comprising a third oil channel coupled to the oil collection tank, wherein an oil outlet of the third oil channel is opposite to a bearing, and wherein the third oil channel is configured to transfer the cooling oil in the oil collection tank to the bearing in order to lubricate the gear set.

14. The power assembly of claim 1, further comprising:
    a stator iron core disposed in the housing, wherein the stator iron core has a cooling channel; and
    a fourth oil channel, wherein the oil collection tank communicates with the cooling channel using the fourth oil channel, and wherein fourth oil channel is configured to transfer the cooling oil in the oil collection tank to the cooling channel.

15. An electric vehicle comprising:
    a power assembly comprising:
        a housing comprising an oil storage pool and an oil collection tank;
        a rotor iron core;

a rotating shaft fixed to the rotor iron core and comprising a cooling oil channel, wherein the cooling oil channel comprises a sidewall at a first end and proximate to an oil inlet, wherein the sidewall comprises helical guiding channel, and wherein the helical guiding channel is configured to transfer cooling oil into the cooling oil channel along the helical guiding channel;

a first oil channel;

a gear set comprising:
　a first gear having at least a portion located in the oil storage pool; and
　a driving gear fixed to the rotating shaft; and an oil-pumping system disposed in the housing and comprising an oil pump, wherein the oil pump comprises:
　an oil inlet channel that communicates with the oil storage pool; and
　an oil outlet channel coupled to the cooling oil channel, wherein the oil outlet channel comprises:
　　a second end that extends into the cooling oil channel; and
　　an outer wall spaced from the helical guiding channel by a uniform distance in a radial direction, wherein the oil collection tank is located on a side that is of the rotating shaft and that is away from the oil storage pool, wherein the oil collection tank is configured to collect the cooling oil brought out of the oil storage pool when the gear set rotates, wherein the oil collection tank communicates with the cooling oil channel using the first oil channel, and wherein first oil channel is configured to transfer the cooling oil in the oil collection tank to the cooling oil channel.

16. The electric vehicle of claim 15, wherein the oil outlet channel is coupled to the oil collection tank.

17. The electric vehicle of claim 15, wherein the oil outlet channel is coupled to the cooling oil channel.

18. The electric vehicle of claim 15, wherein the oil outlet channel is coupled to the first oil channel.

19. The electric vehicle of claim 15, wherein the helical guiding channel penetrates through the cooling oil channel.

20. The electric vehicle of claim 15, wherein the power assembly further comprises a second oil channel coupled to the oil collection tank, wherein an oil outlet of the second oil channel is opposite to the gear set, and wherein the second oil channel is configured to transfer the cooling oil in the oil collection tank to the gear set in order to lubricate the gear set.

* * * * *